(12) United States Patent
Gonnet et al.

(10) Patent No.: US 8,265,439 B2
(45) Date of Patent: Sep. 11, 2012

(54) OPTICAL FIBER PREFORM

(75) Inventors: Cedric Gonnet, Paris (FR); Elise Regnier, Bievres (FR); Frans Gooijer, Eindhoven (NL); Pascale Nouchi, Ville D'Avray (FR)

(73) Assignee: Draka Comteq, B.V., Amsterdam (NL)

( * ) Notice: Subject to any disclaimer, the term of this patent is extended or adjusted under 35 U.S.C. 154(b) by 180 days.

(21) Appl. No.: 12/758,405

(22) Filed: Apr. 12, 2010

(65) Prior Publication Data

US 2010/0189398 A1     Jul. 29, 2010

Related U.S. Application Data

(62) Division of application No. 11/627,483, filed on Jan. 26, 2007, now Pat. No. 7,702,204.

(30) Foreign Application Priority Data

Jan. 27, 2006 (FR) ..................................... 06 00754

(51) Int. Cl.
    *G02B 6/02*     (2006.01)
(52) U.S. Cl. ........ 385/123; 382/124; 382/125; 382/126; 382/127
(58) Field of Classification Search .................. 385/123, 385/124, 125, 126, 127
See application file for complete search history.

(56) References Cited

U.S. PATENT DOCUMENTS

| | | | |
|---|---|---|---|
| 4,691,990 A | 9/1987 | Cohen | |
| 5,044,724 A | 9/1991 | Glodis et al. | |
| 5,090,979 A | 2/1992 | Le Sergent et al. | |
| 6,477,864 B2 * | 11/2002 | Drouart et al. | ................... 65/391 |
| 6,988,379 B2 | 1/2006 | Orcel et al. | |
| 7,702,204 B2 | 4/2010 | Gonnet et al. | |
| 2002/0144521 A1 | 10/2002 | Orcel et al. | |
| 2002/0168162 A1 | 11/2002 | Fleury et al. | |
| 2005/0262876 A1 | 12/2005 | Jourdier et al. | |
| 2008/0031582 A1 | 2/2008 | Gonnet et al. | |
| 2010/0189398 A1 | 7/2010 | Gonnet et al. | |
| 2010/0189928 A1 | 7/2010 | Gonnet et al. | |

FOREIGN PATENT DOCUMENTS

| | | |
|---|---|---|
| CN | 101007702 A | 1/2007 |
| EP | 0434237 | 6/1991 |
| EP | 1249432 | 10/2002 |
| EP | 1544175 | 6/2005 |
| EP | 1813581 A1 | 8/2007 |
| FR | 2896795 A1 | 8/2007 |
| JP | 55100233 | 7/1980 |
| WO | 2010/003856 A1 | 1/2010 |

OTHER PUBLICATIONS

European Office Action in counterpart European Application No. 07001536 dated Jul. 28, 2011, pp. 1-4.
European Office Action in counterpart European Application No. 07001536 dated Jun. 28, 2010, pp. 1-4.
Extended European Search Report for counterpart European Application No. 07001536, dated May 7, 2007.

(Continued)

*Primary Examiner* — Jennifer Doan
(74) *Attorney, Agent, or Firm* — Summa, Additon & Ashe, P.A.

(57) ABSTRACT

An optical fiber preform comprises a primary preform that includes at least one inner cladding and a central core deposited inside a fluorine doped silica tube. The fluorine doped silica tube has a cross section area that is no more than about 15 percent smaller than the cross section area of the primary preform. The optical fiber preform has a large capacity, may be manufactured at reduced cost, and may be drawn to produce an optical fiber having reduced transmission losses.

23 Claims, 2 Drawing Sheets

OTHER PUBLICATIONS

Carratt M. et al., "MCVD-Plasma Process for Manufacturing Single-Mode Optical Fibers for Terrestrial Applications," Electrical Communication, Alcatel, pp. 11-14, Brussels, BE, Jan. 1994.

French Search Report and Written Opinion in counterpart French Application No. 06/00754, dated Jul. 19, 2006.

* cited by examiner

OPTICAL FIBER PREFORM

CROSS-REFERENCE TO PRIORITY APPLICATIONS

This application is a division of commonly assigned U.S. patent application Ser. No. 11/627,483 for a Method for Manufacturing an Optical Fiber Preform, filed Jan. 26, 2007, (and published Feb. 7, 2008, as Publication No. 2008/0031582 A1), which itself claims the benefit of French Patent Application No. 06/00754 (filed Jan. 27, 2006, at the National Institute of Industrial Property (France)). Each of the foregoing patent applications and patent application publication is hereby incorporated by reference in its entirety.

FIELD OF THE INVENTION

The present invention relates to an optical preform and a method for manufacturing the optical fiber preform.

BACKGROUND OF THE INVENTION

An optical fiber is made by drawing a preform on a drawing tower. A preform for example comprises a primary preform consisting of a very high quality glass tube, part of the cladding and the core of the fiber. This primary preform is then overcladded or sleeved to increase its diameter and to form a preform which can be used on a drawing tower. In this context, the term inner cladding is used for the cladding formed inside the tube, and outer cladding for the cladding formed on the outside of the tube. The homothetic fiber drawing operation consists of placing the preform vertically in a tower and drawing a fiber strand from one end of the preform. For this purpose a high temperature is applied locally to one end of the preform until the silica is softened, the fiber drawing speed and temperature then being permanently controlled during the draw operation since they determine the diameter of the fiber.

The geometry of the preform must strictly comply with the ratios of the refractive indexes and diameters of the core and the fiber cladding so that the drawn fiber has the required profile. For optical fibers, the index profile is generally qualified in relation to the graph tracing of the function which associates the refractive index with the radius of the fiber. Conventionally the distance r to the center of the fiber is shown along the abscissa axis, and the difference between the refractive index and the refractive index of the outer cladding of the fiber is shown along the ordinate axis. The index profile is therefore referred to as a "step," "trapezoidal" or "triangular" index as per the respective graph tracings of step, trapezoidal or triangular shape. These curves generally represent the theoretical or set profile of the fiber, the manufacturing constraints of the fiber possibly leading to a slightly different profile.

An optical fiber conventionally consists of an optical core whose function is to transmit and optionally amplify an optical signal, and of an optical cladding whose function is to confine the optical signal within the core. For this purpose the refractive indexes of the core $n_c$ and of the cladding $n_g$ are such that $n_c > n_g$. As is well known, the propagation of an optical signal in a single-mode optical fiber decomposes into a fundamental mode guided within the core and into secondary modes guided over a certain distance in the core-cladding assembly, called cladding modes.

As line fiber for optic fiber transmission systems, single mode fibers (SMF) are conventionally used. An SMF fiber conventionally has a core of germanium-doped silica to increase its refractive index, and a cladding of pure silica. To improve attenuation in an optical fiber it is known to reduce the quantity of dopant in the core. However, since the difference in index between the core and the cladding is fixed by the desired propagation properties of the optical fiber, the index of the cladding must then be reduced or at least the index of the inner cladding which is doped with fluorine for example. The condition $n_c > n_g$ for the refractive indexes of the core $n_c$ and cladding $n_g$ must be met to ensure guiding of the optical signal along the fiber.

Fibers with pure silica cores are also known, and are called Pure Silica Core Fibers (PSCF). The absence of dopant in the core of a PSCF fiber makes it possible to limit optical losses. A PSCF fiber therefore conventionally has a cladding in silica doped with fluorine to reduce its refractive index. A PSCF fiber can be manufactured from a preform comprising a primary preform consisting of a tube, generally in quartz, in which one or more layers of fluorine-doped silica have been deposited to form an inner cladding, and one or more layers of pure silica have been deposited to form the central core of the fiber. After depositing the layers corresponding to the core and the inner cladding, the tube is closed onto itself during an operation called collapsing. In this way the primary preform is obtained. This primary preform is then overcladded, generally with natural silica particles for cost-related reasons.

A conventional PSCF fiber, or an optical fiber having a central core scarcely doped with germanium with a cladding doped with fluorine, therefore has an index profile with a central core of radius a and index $n_c$ corresponding to the index of silica or slightly higher than that of silica, and an inner buried cladding of outer radius b. The inner cladding is said to be buried since it has a refractive index $n_g$ that is less than that of the outer cladding $n_e$ obtained by the overcladding or sleeving of the primary preform. This outer cladding is generally of pure silica glass and has substantially the same refractive index as the central core in a PSCF fiber.

In the above-described structure, with an outer cladding having substantially the same refractive index as the central core, the fundamental mode is not completely guided and shows additional losses, called leakage. To minimize these leakage losses, the percentage of energy propagating in the outer, pure silica cladding must be reduced. The ratio between the outer radius of the fluorine-doped inner cladding and the radius of the core (b/a) must therefore be sufficiently high; i.e. the inner cladding of doped silica must be extended at least as far as a critical radius b whose value is dependent on the core radius and on the difference $\Delta n = n_c - n_g$ between the core index and the index of the inner cladding; for a single mode fiber it is considered that a ratio between the radius of the inner cladding and the radius of the core that is 8 or more (b/a>8) ensures good confinement of the optical signal in the central core and an acceptable level of leakage losses.

To enlarge the outer diameter of the fluorine-doped cladding, document JP 55100233 proposed the use of a tube of fluorine-doped silica to manufacture the primary preform.

Also the capacity of a preform is defined as the quantity of optical fiber length which can be drawn from this preform. The greater the diameter of the preform, the greater this capacity. To reduce manufacturing costs, it is desirable to provide long lengths of linear fibers from one same preform. It is therefore sought to fabricate preforms of large diameter while complying with the above-mentioned constraints regarding the diameters of the central core and the fluorine-doped cladding.

In this context, either the ratio between the outer radius of the primary preform and the radius of the central core is relatively high and the quantity of silica to be deposited inside the tube is high, in which case the primary preform is costly and the method is not very productive; or the ratio between the outer radius of the tube and the radius of the central core is relatively low and the optical fiber obtained by drawing from the final preform does not have good properties and its attenuation is substantially higher.

EP 1 544 175 proposes making a preform with a part of the outer cladding in fluorine-doped silica in order to increase the total diameter of the fluorine-doped cladding without increasing the diameter of the costly primary preform. The primary preform is obtained by successive deposits of layers of doped silica in a tube of fluorine-doped silica, and then this primary preform is overcladded with a first layer of synthetic silica particles doped with fluorine then with a layer of natural silica particles. Overcladding with synthetic silica particles doped with fluorine makes it possible to increase the diameter of the fluorine-doped cladding for one same core diameter, and reduce leakage losses. The overclad of the primary preform using silica particles doped with fluorine is less costly than depositing fluorine-doped silica inside the tube. Nonetheless the fluorine-doped silica particles are synthetic particles which are much more expensive than natural silica particles.

US Patent Application Publication No. 2002/0144521 is directed to a method for manufacturing a preform of large capacity. This document proposes making a primary preform by depositing a large diameter central core inside a tube doped with chlorine and fluorine. The tube is doped with fluorine to compensate for the increase in refractive index generated by doping with chlorine. The tube is doped with chlorine to limit the presence of OH groups which degrade the optical transmission properties in the central core. The use of said tube doped with chlorine and fluorine makes it possible to reduce the thickness of the inner cladding deposited in the tube in order to produce a primary preform having an enlarged central core diameter. This primary preform is then overcladded to obtain a final preform of large diameter and hence of large capacity. The tube doped with chlorine and fluorine protects the central core against impurities brought by the overcladding process with natural silica particles. However, the refractive index of this tube is substantially the same as that of pure silica.

The compromise between manufacturing a low cost preform having a large drawing capacity for an optical fiber having reduced optical losses with a central core that is not or only scarcely doped and having an inner cladding doped with fluorine still remains to be improved upon.

SUMMARY OF THE INVENTION

The invention therefore proposes using a tube of fluorine-doped silica which is sufficiently thick to limit the quantity of silica deposited inside the tube and to enable overcladding with natural silica particles, while guaranteeing a ratio between the diameter of the fluorine-doped cladding and the diameter of the core (b/a) that is sufficiently high to ensure the confinement of the optical signal within the central core.

In particular, the invention proposes a method of manufacturing a primary preform having a cross section area, the method including the steps of making a deposit of an inner cladding and a central core inside a fluorine doped silica tube, followed by collapsing the thus obtained tube to form the primary preform, wherein the tube being chosen such that its cross section area is maximally about 15%, for example, maximally about 10%, smaller than the cross section area of the primary preform obtained from the tube after collapsing.

In addition, the present invention proposes a method of manufacturing an optical fiber preform by overcladding the primary preform thus obtained using silica particles to obtain an overclad on the outer surface of the primary preform.

In one embodiment, the invention proposes a method for manufacturing a final optical fiber preform by overcladding a primary preform having a predetermined total cross section area, the method including at least one manufacturing step of the primary preform by deposit of an inner cladding and a central core inside a tube of fluorine-doped silica, the tube being chosen such that its cross section area is maximally about 15%, for example maximally about 10%, smaller than the cross section area of the primary preform.

According to one embodiment, the overcladding is carried out using natural silica particles.

According to one characteristic, the chosen tube has a cross section area of more than about 700 mm$^2$.

According to one embodiment, the chosen tube has a cross section area of less than about 1500 mm$^2$.

According to one embodiment, the chosen tube has a cross section area of less than about 1000 mm$^2$.

According to one embodiment, the deposit inside the tube is controlled so that the ratio of the outer radius of the primary preform to the radius of the central core is superior or equal to about 8.

According to one embodiment, the deposit of the inner cladding is made of silica doped with fluorine or silica doped with fluorine and germanium.

According to one embodiment, the deposit of the central core is made of substantially pure silica, silica slightly doped with germanium or silica slightly doped with germanium and fluorine.

The invention also proposes a final optical fiber preform including a primary preform with a predetermined cross section area and including a tube in fluorine-doped silica having a cross section area that is maximally about 15%, for example maximally about 10%, smaller than the total cross section area of the primary preform in which tube a deposit of an inner cladding and a central core is present; and an overclad on the outer surface of the primary preform.

According to one embodiment, the tube of silica contains fluorine at a concentration of between about 1 and about 2% by weight.

According to one embodiment, the deposit of the inner cladding is of silica doped with fluorine or silica doped with fluorine and germanium.

According to one embodiment, the deposit of the central core is of substantially pure silica, silica slightly doped with germanium or silica slightly doped with germanium and fluorine.

According to one embodiment, the overclad is made of silica, for example, natural silica.

According to one embodiment, the ratio of the outer diameter of the primary preform to the diameter of the central core is superior or equal to about 8.

The present invention also relates to an optical fiber preform wherein the preform includes from the center towards the periphery of a central core having a refractive index $n_c$ and a radius a, a first part of the inner cladding formed by a deposit of an inner cladding having a refractive index $n_{g1}$ and having an outer radius corresponding to $\Phi i$, a second part of the inner cladding formed by the tube having a refractive index $n_{g2}$ and having an outer radius corresponding to $\Phi e$, and an outer cladding having a refractive index $n_e$ having a radius $R_{oc}$, in which $a < \Phi i < \Phi e < R_{oc}$.

According to one embodiment, the absolute value of the difference in refractive index between the second part of the inner cladding formed by the tube and the first part of the inner cladding formed by deposit of the inner cladding, being $|n_{g2}-n_{g1}|$, is equal to or less than about 10% of the difference in refractive index between the central core and the second part of the inner cladding formed by the tube, being $|n_c-n_{g2}|$.

According to another embodiment, $|n_{g2}-n_{g1}|$ is equal to or less than about 1% of $|n_c-n_{g2}|$.

The invention also concerns an optical fiber obtained by drawing of the final preform of the invention.

According to one embodiment, for a wavelength of about 1550 nm, the optical fiber has losses of about 0.18 dB/km or less.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
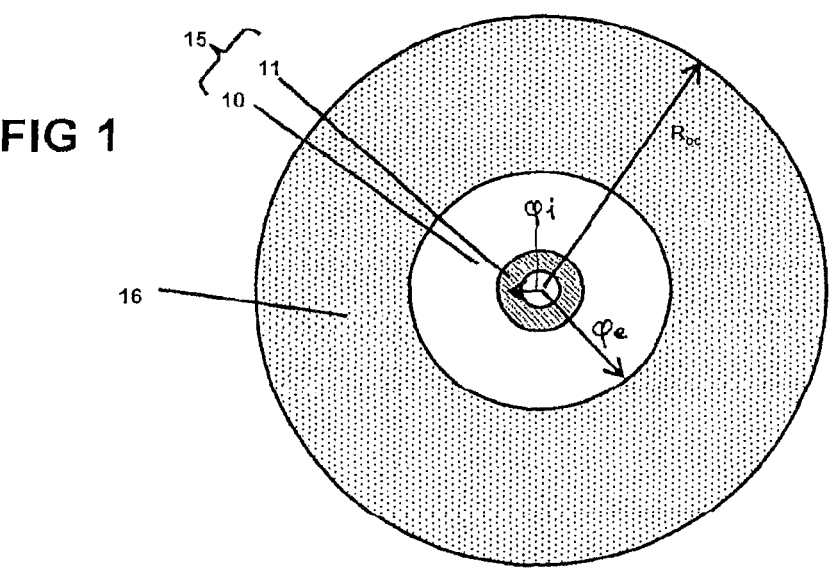
FIG. 1 is a schematic cross-sectional view of a preform of the invention.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The invention proposes a method for fabricating an optical fiber preform.

A primary preform is made from a thick tube in silica doped with fluorine. As used herein the term "thick tube" refers to a tube having a large wall thickness. The cross-section area of the tube is maximally (no more than) about 15%, for example maximally about 10%, less than the total cross section area of the primary preform, i.e. a large part of the inner cladding (the second part of the inner cladding) of the primary preform consists of the thick tube doped with fluorine. A small part of the inner cladding of the primary preform (the first part of the inner cladding) is formed by the deposit of an inner cladding inside the tube. For a desired thickness of the inner cladding, the following is observed. The larger the thickness of the wall of the tube forming the inner cladding, the smaller the required thickness of the deposit of the inner cladding. The quantity of deposit inside the tube is therefore limited and a primary preform of large capacity can be fabricated at low cost. The tube may have a cross section area more than about 700 mm², for example about 900 mm², and a fluorine concentration of between about 1 and about 2% by weight. Most of the tubes used up until now to manufacture a primary preform have a cross section area of less than 400 mm².

The primary preform is manufactured by successive deposits inside the tube of layers of fluorine-doped silica to form an inner cladding, and of layers of pure silica or slightly doped with germanium to form a central core. The deposits inside the tube are of Chemical Vapor Deposition (CVD) type. This type of deposit is made by injecting a gaseous mixture inside the tube consisting of precursors such as silicon tetrachloride ($SiCl_4$), germanium tetrachloride ($GeCl_4$), phosphorus oxychloride ($POCl_3$), silicon tetrafluoride ($SiF_4$) or hexafluoroethane ($C_2F_6$) and oxygen. Oxidation of the precursors makes it possible to synthesize the different layers forming the core and inner cladding of the primary preform. CVD-type depositing encompasses Modified Chemical Vapor Deposition (MCVD), Furnace Chemical Vapor Deposition (FCVD), and Plasma Enhanced Chemical Vapor Deposition (PCVD).

After the deposit of the inner cladding and the central core, the primary preform is collapsed. After collapsing, the obtained primary preform is overcladded with silica particles, for example low cost natural silica particles to obtain a final preform. The overcladding of the final preform can be made by plasma deposit in which the (natural) silica particles are blown and fused by a plasma torch under a temperature in the region of about 2300° so that they are vitrified on the periphery of the primary preform. The overcladding operation is generally conducted in a closed cabin under a controlled atmosphere to ensure protection against electromagnetic disturbances and release of ozone emitted by the plasma torch.

FIG. 1 shows a cross-sectional view of the final optical fiber preform of the invention. The final optical fiber preform was obtained by an overclad 16 of a primary preform 15. The primary preform 15 has a total cross section area that is predetermined in relation to the desired fiber drawing capacity. The primary preform 15 was fabricated by CVD deposit 11 of layers of doped and/or substantially pure silica inside a tube 10. According to the invention, the tube 10 used to manufacture the primary preform 15 is a tube 10 of silica doped with fluorine, for example at a concentration of between about 1 and about 2% by weight. Also, the tube 10 of fluorine-doped silica used in the method of the invention is thick, i.e. has a large wall thickness, with a cross section area designated by the abbreviation CSA that is maximally about 15%, for example maximally about 10%, less than the total cross section area of the primary preform 15. For example, the tube 10 may have a cross section area of more than about 700 mm² and less than about 1500 mm², for example less than about 1000 mm². The cross section area is expressed as follows:

$$CSA=\pi(\Phi e^2-\Phi i^2)$$

where $\Phi e$ and $\Phi i$ are the respective outer (exterior) and inner (interior) radii of the tube 10. $R_{oc}$ denotes the radius of the outer cladding.

To obtain a CSA of high value, greater than about 700 mm² and less than about 1500 mm², for example less than 1000 mm², the tube 10 must have both a large outer diameter and a small inner diameter, i.e. it must have a large wall thickness.

To fabricate an optical fiber with a central core that is not or only slightly doped with germanium, the presence of fluorine in the tube 10 and the large wall thickness of the tube 10 make it possible to limit the thickness of the inner cladding doped with fluorine to be deposited inside the tube 10, without it being necessary to deposit an outer cladding doped with fluorine to guarantee the characteristics of signal propagation within the core. The advantage of doping with fluorine is that this reduces the influence of the water peak, especially in a PCVD process.

The small inner radius $\Phi i$ of the tube 10 makes it possible to limit the thickness of the layers deposited inside the tube 10, CVD-type deposits being relatively costly. Only the central core and a small portion of the fluorine-doped inner cladding are deposited inside the tube 10. The large outer radius $\Phi e$ of the tube 10 allows the use of natural silica particles for the overclad 16 of the primary preform 15, which is less costly, while guaranteeing a large buried cladding on the optical fiber obtained after fiber drawing.

It is therefore possible to fabricate primary preforms 15 with a large central core occupying a large portion of the layers 11 deposited inside the tube 10, and hence to increase the fiber drawing capacity of the final optical fiber preform, without deteriorating the optical signal propagating characteristics.

For example from a tube 10 having a cross section area of about 900 mm$^2$, it is possible to manufacture a primary preform 15 having a cross section area of about 1035 mm$^2$ by only depositing about 135 mm$^2$ linear of silica via CVD deposit 11. The cost of manufacturing the primary preform 15 is therefore reduced. More generally, the cross section area of the primary preform 15 will only be about 10% to about 15% greater than the cross section area of the tube 10. The quantity of deposit 11 inside the tube 10 is therefore limited in the method of the invention. In addition, from the primary preform 15, having a cross section area in the order of about 1035 mm$^2$, it is possible, after overcladding 16 is performed, to obtain a final optical fiber preform of large diameter enabling the drawing of a large linear quantity of fiber, i.e. approximately 250 km of fiber for a final optical fiber preform of about 1 meter.

The thick tube 10 of fluorine-doped silica may be fabricated using the so-called sol-gel technique known as such, which consists of fabricating a silica gel which is molded into tube form and dried. A rigid but porous tube is obtained which is densified in a stream of hot air. A fluorine dopant may be added directly to the silica gel or when heating the tube dried by injection of a fluorinated gas.

Figure 2:
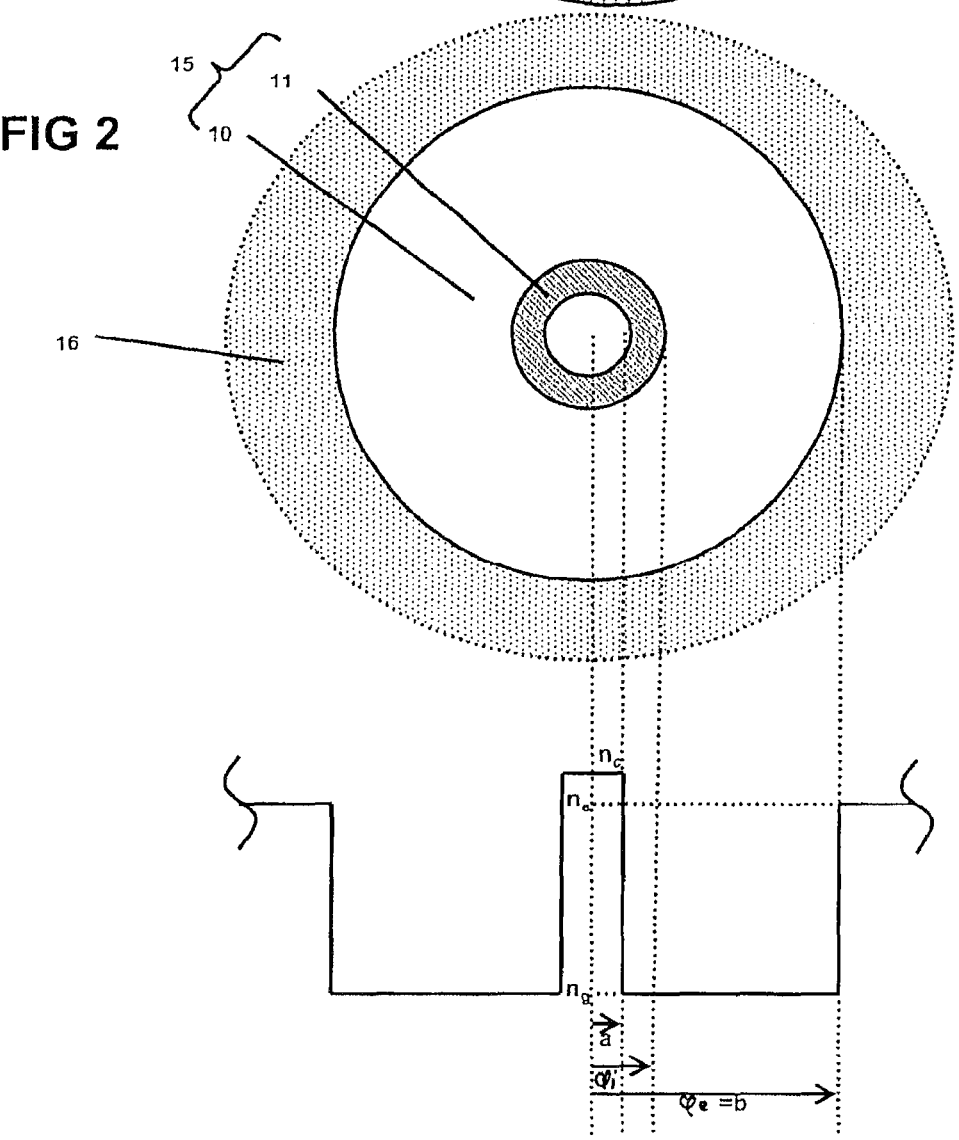
FIG. 2 illustrates an example of a set index profile for an optical fiber obtained by drawing of the preform of the invention related to a schematic cross-section view of a preform of the invention (not to scale)

FIG. 2 shows a set index profile of the fiber obtained by homothetic drawing of the present optical fiber preform. This set index profile is related in FIG. 2 to a cross-sectional view of a preform according to the present invention (not to scale).

In FIG. 2 the central core can be seen of radius a and refractive index $n_c$, substantially equal to the refractive index of the outer cladding $n_e$ which corresponds to the index of pure silica. The core may be of substantially pure or slightly doped silica and the outer cladding can be of substantially pure silica for the cost-related reasons mentioned above. An inner cladding of refractive index $n_g$ separates the core from the outer cladding. The inner cladding is buried, i.e. its refractive index $n_g$ is lower than the index of the outer cladding $n_e$. This condition is laid down by the fact that the central core has a refractive index $n_c$ close to that of pure silica and the relationship $n_c > n_g$ must be maintained to guarantee the propagation of the optical signal.

For that purpose, the inner cladding is of fluorine-doped silica. As indicated above, the inner cladding of the fiber corresponds to the zone of the present preform covering the tube 10 and the inner cladding deposited inside the tube 10. More specifically, the buried cladding comprises layers of fluorine-doped silica deposited by PCVD deposit for example in the tube 10 and the tube 10 itself.

It is shown in the drawing of FIG. 2 the core radius a, the radius of the inner cladding deposited in the tube 10 and which corresponds to the inner radius of the tube 10 Φi and the outer radius of the tube 10 Φe which corresponds to the outer radius b of the fluorine-doped cladding. The outer radius b of the fluorine-doped cladding therefore corresponds to the outer radius of the primary preform 15 obtained by the manufacturing method of the invention before overcladding. Therefore according to the definitions given previously, the ratio b/a or Φe/a is about 8 or more. The optical signal propagating in a fiber having the index profile of FIG. 2 will therefore be effectively confined in the central core whether slightly doped or non-doped.

Figure 3:
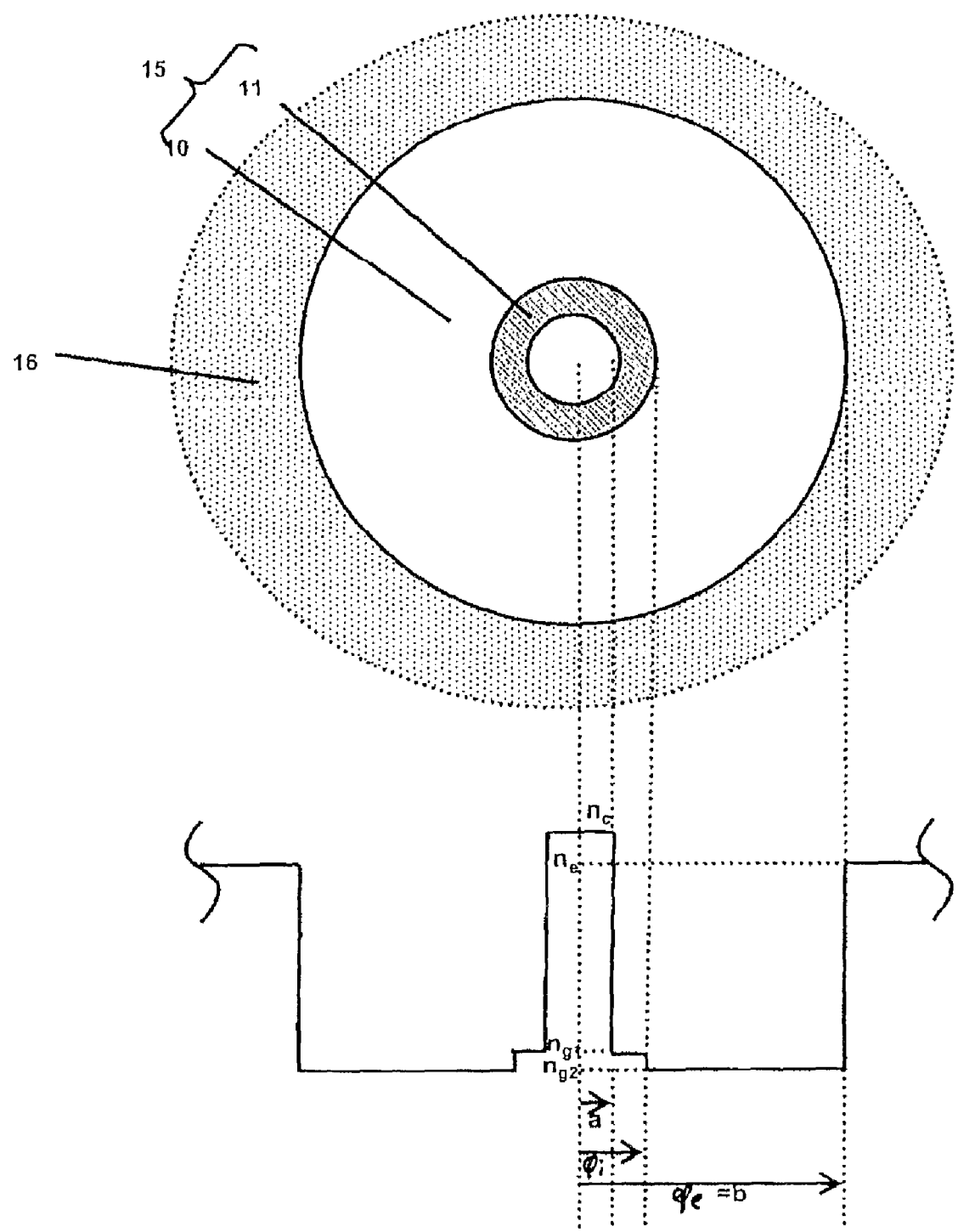
FIG. 3 illustrates another example of a set index profile for an optical fiber obtained by drawing of the preform of the invention related to a schematic cross-section view of a preform of the invention (not to scale).

In FIG. 3 another embodiment of the present invention is shown. FIG. 3 shows another set index profile of the fiber obtained by homothetic drawing of the present optical fiber preform. This set index profile is related in FIG. 3 to a cross-sectional view of a preform according to the present invention (not to scale). In this embodiment the refractive index of the inner cladding consists of two levels, firstly the refractive index $n_{g1}$ of the small or first part of the inner cladding formed by the deposit 11 of the inner cladding and secondly the refractive index $n_{g2}$ of the large or second part of the inner cladding formed by tube 10. The two levels can be the same, being $n_{g1} = n_{g2}$. However, it is possible that small variations occur during depositing of the inner cladding inside the tube 10. The absolute value of the difference in refractive index between the inner cladding formed by the tube 10 and the deposit 11 of the inner cladding, viz. between $n_{g2}$ and $n_{g1}$ ($|n_{g2} - n_{g1}|$) can be equal to or less than about 10%, for example about 1%, of the difference in refractive index between the inner cladding formed by the tube 10 and the deposit 11 of the inner cladding, viz. between $n_c$ and $n_{g2}$ ($|n_c - n_{g2}|$). This means that the level of $n_{g1}$ may be slightly above or slightly below the level of $n_{g2}$.

The optical losses in a fiber drawn from the inventive preform will be about 0.18 dB/km or less for a transmission wavelength of about 1550 nm. With the method of the invention, it is therefore possible to manufacture a preform of large capacity at reduced cost which allows the drawing of an optical fiber having reduced transmission losses.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

The invention claimed is:

1. An optical fiber preform, comprising:
   a primary preform comprising a central core, an inner cladding, and a fluorine doped silica tube, the inner cladding being positioned between the central core and the fluorine doped silica tube;
   wherein the fluorine doped silica tube has a cross section area no more than about 15 percent smaller than the cross section area of the primary preform.

2. The optical fiber preform according to claim 1, wherein the cross section area of the fluorine doped silica tube is no more than about 10 percent smaller than the cross section area of the primary preform.

3. The optical fiber preform according to claim 1, wherein the fluorine doped silica tube comprises about 1 to about 2 percent by weight fluorine.

4. The optical fiber preform according to claim 1, wherein the inner cladding comprises silica doped with fluorine or silica doped with fluorine and germanium.

5. The optical fiber preform according to claim 1, wherein the central core comprises substantially pure silica, silica doped with germanium, or silica doped with germanium and fluorine.

6. The optical fiber preform according to claim 1, wherein the ratio of the outer radius of the primary preform to the radius of the central core is greater than or equal to about 8.

7. The optical fiber preform according to claim 1, wherein the cross section area of the fluorine doped silica tube is more than about 700 mm$^2$.

8. The optical fiber preform according to claim 7, wherein the cross section area of the fluorine doped silica tube is less than about 1500 mm$^2$.

9. The optical fiber preform according to claim 1, wherein the cross section area of the fluorine doped silica tube is less than about 1000 mm$^2$.

10. The optical fiber preform according to claim 1, wherein the inner cladding and central core have a combined cross section area of no more than about 135 mm$^2$.

11. The optical fiber preform according to claim 1, wherein:
   the central core has a refractive index $n_c$ and a radius a;
   the inner cladding has a refractive index $n_{g1}$ and an outer radius $\Phi i$;
   the fluorine doped silica tube has a refractive index $n_{g2}$ and an outer radius $\Phi e$;
   $a<\Phi i<\Phi e$; and
   the absolute value of the refractive index difference between the fluorine doped silica tube and the inner cladding $|n_{g2}-n_{g1}|$ is less than or equal to about 10 percent of the absolute value of the refractive index difference between the central core and the fluorine doped silica tube $|n_c-n_{g2}|$.

12. The optical fiber preform according to claim 11, wherein $|n_{g2}-n_{g1}|$ is less than or equal to about 1 percent of $|n_c-n_{g2}|$.

13. An optical fiber drawn from the optical fiber preform according to claim 1.

14. An optical fiber preform, comprising:
   a primary preform comprising a central core, an inner cladding, and a fluorine doped silica tube, the inner cladding being positioned between the central core and the fluorine doped silica tube; and
   an overclad on an outer surface of the primary preform;
   wherein the fluorine doped silica tube has a cross section area no more than about 15 percent smaller than the cross section area of the primary preform.

15. The optical fiber preform according to claim 14, wherein the cross section area of the fluorine doped silica tube is no more than about 10 percent smaller than the cross section area of the primary preform.

16. The optical fiber preform according to claim 14, wherein the overclad comprises natural silica.

17. The optical fiber preform according to claim 14, wherein:
   the central core has a refractive index $n_c$ and a radius a;
   the inner cladding has a refractive index $n_{g1}$ and an outer radius $\Phi i$;
   the fluorine doped silica tube has a refractive index $n_{g2}$ and an outer radius $\Phi e$;
   the overclad has a refractive index $n_e$ and a radius $R_{oc}$; and
   $a<\Phi i<\Phi e<R_{oc}$.

18. The optical fiber preform according to claim 17, wherein the central core's refractive index $n_c$ is substantially equal to the overclad's refractive index $n_e$.

19. The optical fiber preform according to claim 17, wherein the absolute value of the refractive index difference between the fluorine doped silica tube and the inner cladding $|n_{g2}-n_{g1}|$ is less than or equal to about 10 percent of the absolute value of the refractive index difference between the central core and the fluorine doped silica tube $|n_c-n_{g2}|$.

20. The optical fiber preform according to claim 19, wherein $|n_{g2}-n_{g1}|$ is less than or equal to about 1 percent of $|n_c-n_{g2}|$.

21. An optical fiber drawn from the optical fiber preform according to claim 14, wherein the optical fiber has transmission losses less than or equal to about 0.18 dB/km at a wavelength of about 1550 nm.

22. An optical fiber preform, comprising:
   a primary preform comprising a central core, an inner cladding surrounding the central core, and a collapsed fluorine doped silica tube surrounding the inner cladding and the central core; and
   an overclad surrounding the primary preform;
   wherein the central core consists essentially of substantially pure silica; and
   wherein the fluorine doped silica tube has a cross section area no more than about 15 percent smaller than the cross section area of the primary preform.

23. The optical fiber preform according to claim 22, wherein the inner cladding contiguously surrounds the central core, the collapsed fluorine doped silica tube contiguously surrounds the inner cladding, and the overclad contiguously surrounds the collapsed fluorine doped silica tube.

* * * * *